United States Patent
Juzswik et al.

(10) Patent No.: US 9,302,677 B2
(45) Date of Patent: Apr. 5, 2016

(54) METHODS FOR PROVIDING OPERATOR SUPPORT UTILIZING A VEHICLE TELEMATICS SERVICE SYSTEM

(71) Applicant: GM GLOBAL TECHNOLOGY OPERATIONS LLC, Detroit, MI (US)

(72) Inventors: Karen Juzswik, Ypsilanti, MI (US); Robert A. Hrabak, West Bloomfield, MI (US); John J. Correia, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 23 days.

(21) Appl. No.: 14/260,418

(22) Filed: Apr. 24, 2014

(65) Prior Publication Data

US 2015/0307111 A1    Oct. 29, 2015

(51) Int. Cl.
*B60W 50/08* (2012.01)
*B60R 16/02* (2006.01)
*H04M 3/51* (2006.01)
*H04W 76/02* (2009.01)
*H04N 21/4223* (2011.01)
*H04N 21/422* (2011.01)
*B60R 16/023* (2006.01)
*H04L 29/08* (2006.01)

(52) U.S. Cl.
CPC .............. *B60W 50/08* (2013.01); *B60R 16/023* (2013.01); *H04L 67/12* (2013.01); *H04M 3/51* (2013.01); *H04N 21/4223* (2013.01); *H04N 21/42203* (2013.01); *H04W 76/02* (2013.01); *B60W 2560/00* (2013.01); *Y02P 90/02* (2015.11)

(58) Field of Classification Search
CPC .......... G06Q 31/016; H04N 21/42203; H04N 21/4223
See application file for complete search history.

(56) References Cited

U.S. PATENT DOCUMENTS

| | | | | |
|---|---|---|---|---|
| 6,028,537 A * | 2/2000 | Suman | ................... | B60K 35/00 340/426.14 |
| 2004/0244056 A1* | 12/2004 | Lorenz et al. | ................. | 725/135 |
| 2007/0252689 A1* | 11/2007 | Rothschild | ............... | 340/539.13 |
| 2013/0030948 A1* | 1/2013 | Fisher, Jr. | ................... | 705/26.5 |
| 2015/0052067 A1* | 2/2015 | Thiyagarajan et al. | ....... | 705/304 |

* cited by examiner

*Primary Examiner* — Mussa A Shaawat
*Assistant Examiner* — Thomas Ingram
(74) *Attorney, Agent, or Firm* — Ingrassia Fisher & Lorenz, P.C.

(57) ABSTRACT

A method for providing interaction with an operator of a vehicle includes receiving request, from the operator of the vehicle and using a telematics system of the vehicle, for support or assistance regarding use of the telematics system, establishing a remote voice communication link between the vehicle and a remotely located call center, using the telematics system, and establishing a remote data communication link between the vehicle and the remotely located call center, using the telematics system. The method further includes providing verbal interaction or instruction regarding the use of the telematics system through the established remote voice communication, using the telematics system and/or providing audio/visual remote control, demonstrating or executing the use of the telematics system through the established remote data communication link, using the telematics system.

20 Claims, 6 Drawing Sheets

METHODS FOR PROVIDING OPERATOR SUPPORT UTILIZING A VEHICLE TELEMATICS SERVICE SYSTEM

TECHNICAL FIELD

The technical field generally relates to systems and methods for remotely providing operator support services, and more particularly relates to systems and methods for providing interaction with a vehicle operator utilizing a vehicle telematics service system.

BACKGROUND

Modern vehicles typically include several systems that are designed to increase vehicle safety, increase driver comfort, increase driver convenience, etc. As more and more such systems are added to vehicles, vehicle electronics, devices, and electrical systems are becoming much more complex. Often, to obtain operator support and guidance in the operation of such systems, vehicle operators bring their vehicles to service advisors at a vehicle dealership. This results in a significant time cost to the vehicle operator, as well as increasing the service demand experienced by the dealership. Improved systems and methods to provide guidance in the operation of complex vehicle systems would be desirable.

SUMMARY

Various embodiments of systems and methods for providing interaction with a vehicle operator utilizing a vehicle telematics service system. In one embodiment, a method for providing interaction with an operator of a vehicle includes receiving request, from the operator of the vehicle and using a telematics system of the vehicle, for support or assistance regarding use of the telematics system, establishing a remote voice communication link between the vehicle and a remotely located call center, using the telematics system, and establishing a remote data communication link between the vehicle and the remotely located call center, using the telematics system. The method further includes providing verbal interaction or instruction regarding the use of the telematics system through the established remote voice communication, using the telematics system and/or providing audio/visual remote control, demonstrating or executing the use of the telematics system through the established remote data communication link, using the telematics system.

DESCRIPTION OF THE DRAWINGS

One or more embodiments will hereinafter be described in conjunction with the following drawing figures, wherein like numerals denote like elements, and wherein.

DETAILED DESCRIPTION

Figure 1:
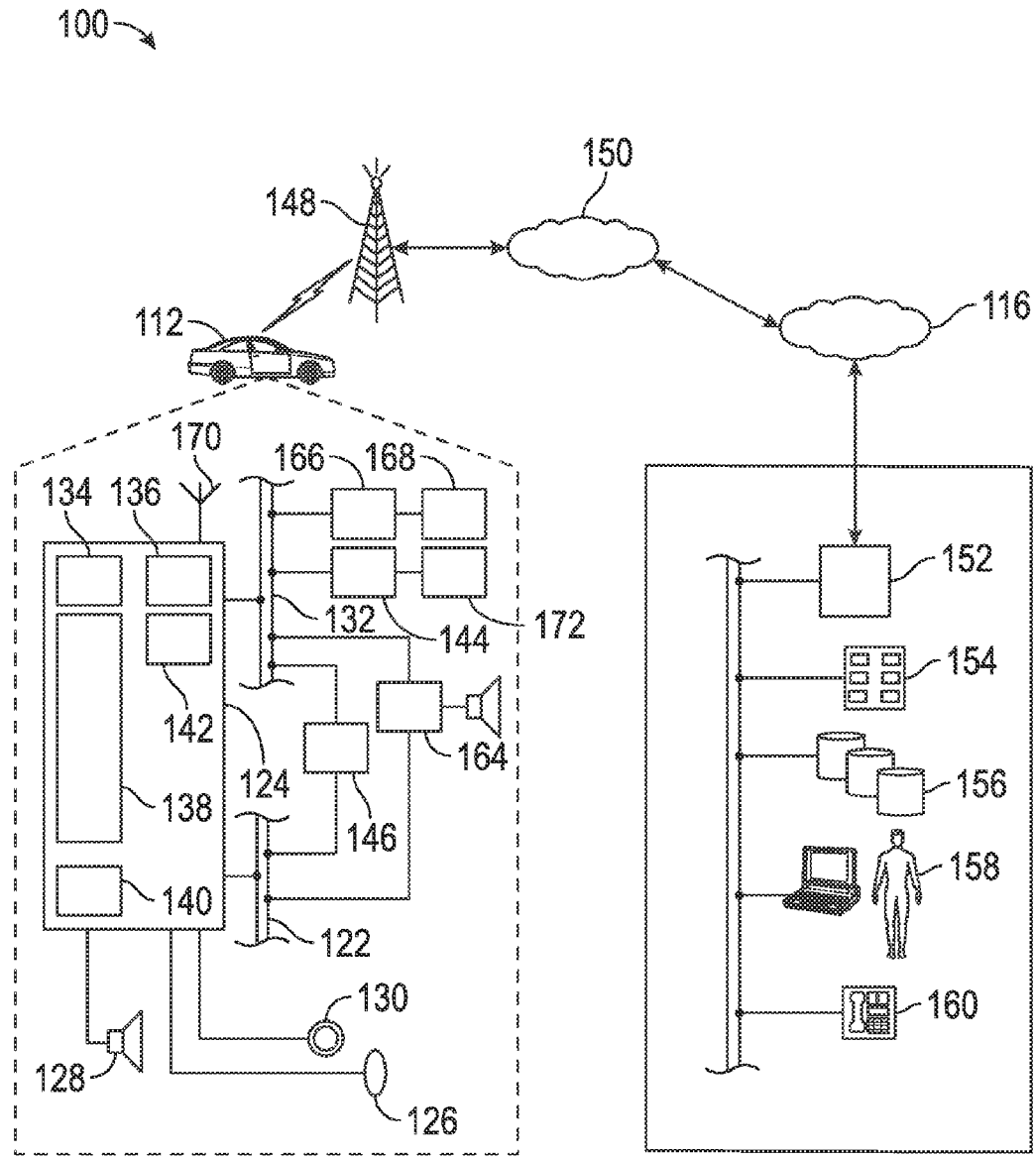
FIG. 1 is a schematic view illustrating an embodiment of a telematics service system suitable for use with the methods disclosed herein.

The following detailed description is merely exemplary in nature and is not intended to limit application and uses. Furthermore, there is no intention to be bound by any expressed or implied theory presented in the preceding technical field, background, brief summary or the following detailed description.

Embodiments of the present disclosure are generally directed to improved methods and systems for providing operator support, assistance, and/or interaction in the operation of vehicle systems, such as vehicle information and entertainment ("infotainment") systems, are disclosed herein. They provide an enhanced, comprehensive means of assisting an operator with their infotainment system and reporting issues observed. These methods entail the use of a telematics service system to verbally communicate with an operator of a vehicle and electronically communicate with a vehicle infotainment system for the purposes of providing interaction with the operator in the use of the vehicle infotainment system. As used herein, the term "operator" when used in conjunction with the term "vehicle" shall refer to either the driver of the vehicle, an occupant of the vehicle, or both. Using the disclosed systems and methods, a service advisor has the ability to remotely view the infotainment displays and to observe issues the operator is having. As used herein, the terms "advisor" and "service advisor" refer to a person located remotely from the vehicle with knowledge of the operation of the vehicle's infotainment system, and who is employed to aid the operator in the use and understanding of the vehicle's infotainment system. Additionally the advisor can take control of the display, using the same controls and buttons available to the operator, to help guide the operator through menus and features. The advisor could also send tutorial videos and/or audio. Additionally, the advisor has the ability to initiate voice recognition and send audio directly to the voice recognition system, to provide examples to the operator on how to use the voice recognition system. The described embodiments provide remote access and control of vehicle infotainment for uses such as operator support, assistance, and/or interaction, debugging and diagnostics, and operator understanding of product usage with the operator's permission. The disclosed systems and method thus provide a shared experience with video and audio interaction between operator and advisor.

Telematics Service System

Telematics service systems are well known and have become common in the marketplace. One well-known telematics service system is marketed under the trade name "OnStar". A telematics service system may include, but is not limited to, a telematics unit that is mounted to a plurality of vehicles, a call center equipped with a variety of computer equipment and manned by a plurality of service advisors, and a wireless communication network that communicatively connects the call center to the vehicle. The telematics unit may be connected to the vehicle bus and configured to monitor multiple vehicle systems. The telematics unit may be configured for both voice and data communications. The communicative connection between the call center and the vehicle facilitates both voice and data communications between the vehicle/operator, on the one hand, and the call center on the other.

In some instances, communication with the operator may include asking the operator a series of questions relating to any difficulties the operator may be having with the use of the telematics system of the vehicle. In other instances, communication with the operator may include transmitting still images or video images to the operator that feature information regarding the use of the telematics service system of the vehicle. In some instances, communication with the vehicle may include data communications between the telematics unit and the call center wherein the telematics unit transmits data to the call center pertaining to the operator's usage of the vehicle telematics system features and/or functions.

All of this information may be useful to aid the service advisor in assisting the operator on the one hand, and on the other hand aid the user in the use and understanding of the vehicle telematics system. A further understanding of the methods for assisting the operator in understanding and utilizing telematics services may be obtained through a review of the illustrations accompanying this application together with a review of the detailed description that follows.

With reference to FIG. 1, there is shown a non-limiting example of a telematics service system 100 that may be used to perform the methods disclosed herein. Telematics service system 100 generally includes a vehicle 112, a wireless carrier system 114, a land network 116, and a call center 118. It should be appreciated that the overall architecture, setup and operation, as well as the individual components of the illustrated system are merely exemplary and that differently configured telematics service systems may also be utilized to implement the examples of the method disclosed herein. Thus, the following paragraphs, which provide a brief overview of the illustrated telematics service system 100, are not intended to be limiting.

Vehicle 112 may be any type of mobile vehicle such as a motorcycle, car, truck, recreational vehicle (RV), boat, plane, etc., and is equipped with suitable hardware and software that enables it to communicate over telematics service system 100. Some of the vehicle hardware 120 is shown generally in FIG. 1 including a telematics unit 124, a microphone 126, a speaker 128, and buttons and/or controls 130 connected to the telematics unit 124. Operatively coupled to the telematics unit 124 is a network connection or vehicle bus 132. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 124 is an onboard device that provides a variety of services through its communication with the call center 118, and generally includes an electronic processing device 138, one or more types of electronic memory 140, a cellular chipset/component 134, a wireless modem 136, a dual mode antenna 170, and a navigation unit containing a GPS chipset/component 142. In one example, the wireless modem 136 includes a computer program and/or set of software routines adapted to be executed within processing device 138.

The telematics unit 124 may provide various services including: turn-by-turn directions and other navigation-related services provided in conjunction with the GPS chipset/component 142; airbag deployment notification and other emergency or roadside assistance-related services provided in connection with various crash and/or collision sensor interface modules 166 and collision sensors 168 located throughout the vehicle; and/or infotainment-related services where music, internet web pages, movies, television programs, videogames, and/or other content are downloaded by an infotainment center 146 operatively connected to the telematics unit 124 via vehicle bus 132 and audio bus 122 (and as will be described in greater detail below regarding the vehicle infotainment system). In one example, downloaded content is stored for current or later playback. The above-listed services are by no means an exhaustive list of all the capabilities of telematics unit 124, but are simply an illustration of some of the services that the telematics unit may be capable of offering. It is anticipated that telematics unit 124 may include a number of additional components in addition to and/or different components from those listed above.

Vehicle communications may use radio transmissions to establish a voice channel with wireless carrier system 114 so that both voice and data transmissions can be sent and received over the voice channel. Vehicle communications are enabled via the cellular chipset/component 134 for voice communications and the wireless modem 136 for data transmission. In order to enable successful data transmission over the voice channel, wireless modem 136 applies some type of encoding or modulation to convert the digital data so that it can be communicated through a vocoder or speech codec incorporated in the cellular chipset/component 134. Any suitable encoding or modulation technique that provides an acceptable data rate and bit error can be used with the present examples. Dual mode antenna 170 services the GPS chipset/component 142 and the cellular chipset/component 134.

Microphone 126 provides the driver or other vehicle operator with a means for inputting verbal or other auditory commands, and can be equipped with an embedded voice processing unit utilizing a human/machine interface (HMI) technology known in the art (and as will be described in greater detail below regarding the automated voice recognition (AVR) system). Conversely, speaker 128 provides audible output to the vehicle operators and can be either a stand-alone speaker specifically dedicated for use with the telematics unit 124 or can be part of a vehicle audio component 164. In either event, microphone 126 and speaker 128 enable vehicle hardware 120 and call center 118 to communicate with the occupants through audible speech. The vehicle hardware also includes one or more buttons and/or controls 130 for enabling a vehicle operator to activate or engage one or more of the components of vehicle hardware 120. For example, one of the buttons and/or controls 130 can be an electronic pushbutton used to initiate voice communication with call center 118 (whether it be a human such as advisor 158 or an automated call response system). In another example, one of the buttons and/or controls 130 can be used to initiate emergency services.

The audio component 164 is operatively connected to the vehicle bus 132 and the audio bus 122. The audio component 164 receives analog information, rendering it as sound, via the audio bus 122. Digital information is received via the vehicle bus 132. The audio component 164 provides amplitude modulated (AM) and frequency modulated (FM) radio, compact disc (CD), digital video disc (DVD), and multimedia functionality independent of the infotainment center 146. Audio component 164 may contain a speaker system, or may utilize speaker 128 via arbitration on vehicle bus 132 and/or audio bus 122.

The vehicle crash and/or collision detection sensor interface 166 is operatively connected to the vehicle bus 132. The collision sensors 168 provide information to the telematics unit via the crash and/or collision detection sensor interface 166 regarding the severity of a vehicle collision, such as the angle of impact and the amount of force sustained.

Vehicle sensors 172, connected to various sensor interface modules 144 are operatively connected to the vehicle bus 132. Example vehicle sensors include but are not limited to gyroscopes, accelerometers, magnetometers, emission detection, and/or control sensors, and the like. Example sensor interface modules 144 include powertrain control, climate control, and body control, to name but a few.

Wireless carrier system 114 may be a cellular telephone system or any other suitable wireless system that transmits signals between the vehicle hardware 120 and land network 116. According to an example, wireless carrier system 114 includes one or more cell towers 148, base stations and/or mobile switching centers (MSCs) 150, as well as any other networking components required to connect the wireless carrier system 114 with land network 116. As appreciated by those skilled in the art, various cell tower/base station/MSC arrangements are possible and could be used with wireless carrier system 114. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 116 can be a conventional land-based telecommunications network that is connected to one or more landline telephones, and that connects wireless carrier system 114 to call center 118. For example, land network 116 can include a public switched telephone network (PSTN) and/or an Internet protocol (IP) network, as is appreciated by those skilled in the art. Of course, one or more segments of the land network 116 can be implemented in the form of a standard wired network, a fiber or other optical network, a cable network, other wireless networks such as wireless local networks (WLANs) or networks providing broadband wireless access (BWA), or any combination thereof.

Call center 118 is designed to provide the vehicle hardware 120 with a number of different system back-end functions and, according to the example shown here, generally includes one or more switches 152, servers 154, databases 156, advisors 158, as well as a variety of other telecommunication/computer equipment 160. These various call center components are suitably coupled to one another via a network connection or bus 162, such as the one previously described in connection with the vehicle hardware 120. Switch 152, which can be a private branch exchange (PBX) switch, routes incoming signals so that voice transmissions are usually sent to either advisor 158 or an automated response system, and data transmissions are passed on to a modem or other telecommunication/computer equipment 160 for demodulation and further signal processing. The modem or other telecommunication/computer equipment 160 may include an encoder, as previously explained, and can be connected to various devices such as a server 154 and database 156. For example, database 156 could be designed to store subscriber profile records, subscriber behavioral patterns, or any other pertinent subscriber information. Although the illustrated example has been described as it would be used in conjunction with a manned call center 118, it will be appreciated that the call center 118 can be any central or remote facility, manned or unmanned, mobile or fixed, to or from which it is desirable to exchange voice and data.

Information and Entertainment ("Infotainment") System

Vehicles, including, cars and trucks, have long included entertainment systems. In particular, vehicles have long included radio tuners, compact disk players, video players, and other means of delivering audio entertainment to passengers. Either a knob or buttons on the steering wheel typically control the volume of entertainment systems. Exemplary controls for such systems were described above, namely audio component 164.

An automotive navigation system is a satellite navigation system designed for use in vehicles. A navigation system typically uses a global positioning system (GPS) navigation device to acquire position data to locate the vehicle on a road in the unit's map database. Using the map database, the unit can give directions to other locations along roads also in its database. An exemplary navigation system was described above, namely GPS chipset component 142.

In some vehicles, the entertainment system is coupled to the navigation system. This allows the navigation system to provide audio direction prompts ("prompts") to the passengers utilizing the speakers coupled to the entertainment system. A system having both entertainment and navigation capabilities shall be referred to herein as an "infotainment" system. An exemplary infotainment system was initially noted above regarding infotainment center 146. Greater detail thereof in now provided.

Figure 2:
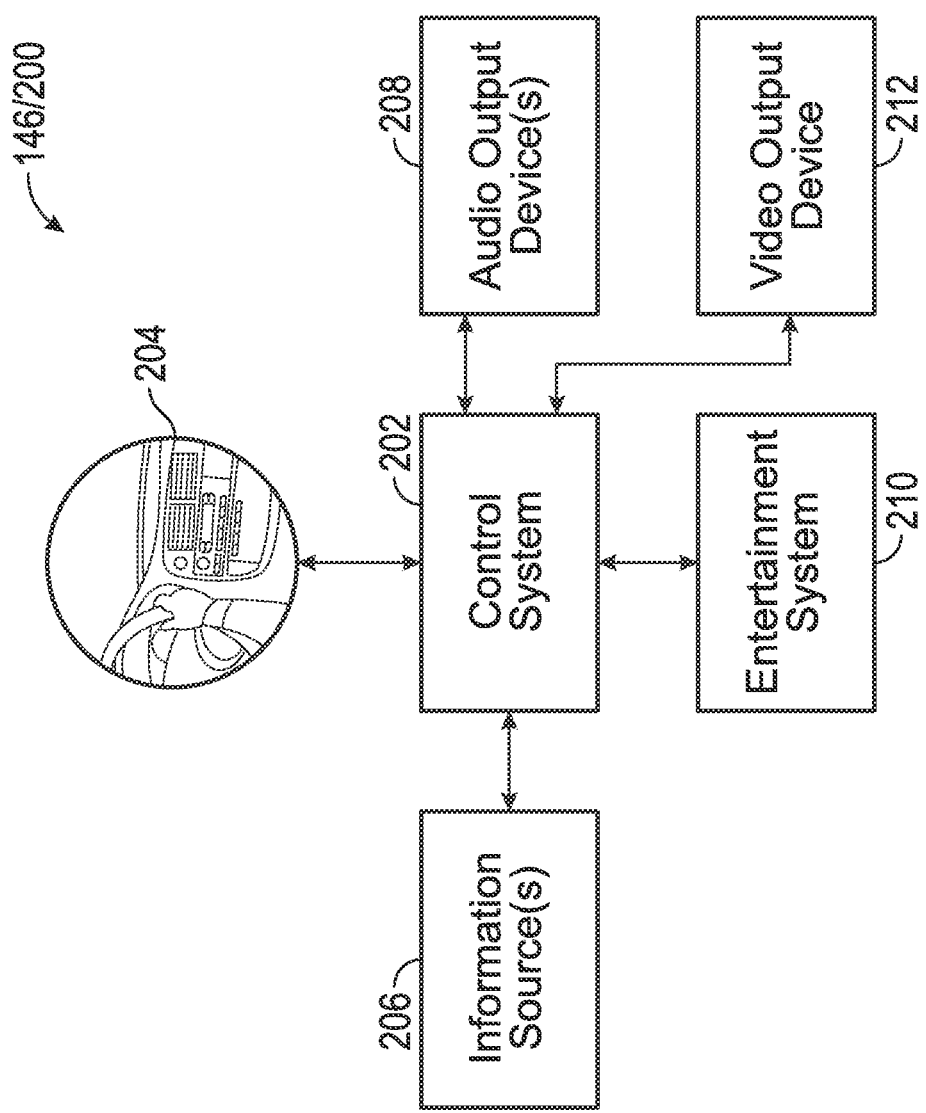
FIG. 2 is a schematic view illustrating an embodiment of an information and entertainment ("infotainment") system suitable for use with the methods disclosed herein.

In accordance with an exemplary embodiment, FIG. 2 schematically illustrates the exemplary infotainment system 200, such as infotainment system 146 as described above in FIG. 1, that may be utilized, for example, in the vehicle 112 (not shown in FIG. 2). While the following discussion is based on implementation in an automobile, the teachings herein may be applied in other contexts. For example, the infotainment system 146 could be utilized on a motorcycle, all-terrain vehicle, or in a home entertainment system.

The infotainment system 146 (also referred to generally herein as "system") may include an infotainment control system 202. The control system 202 receives inputs from various sources and controls access to the audio output device(s) 208. In one embodiment, audio output device(s) 208 may include the previously described speaker 128. In other embodiments, other audio output device(s) 208 may be provided.

The control system 202 may receive input signals from an information system 206. The information system 206 may include, but is not limited to, a navigation system such as GPS chipset component 142, a personal digital assistant (PDA), a radio tuner, a cellular telephone, an Internet connection, a microphone such as microphone 126, or any other device capable of providing information to the control system 202.

The control system 202 may also receive input signals from an entertainment system 210. The entertainment system 210 may include, but is not limited to, one or more of a compact disk (CD) player, a radio tuner, a digital video disk (DVD) player, a portable media player, or other now available or later created devices that provide entertainment, and may include all or a portion of audio component 164, as described above.

In order for the information or entertainment provided by the information source 206 or entertainment system 210 to be experienced by a passenger, the control system 202 provides the information or entertainment to one or both of the audio output 208 or video output 212. The audio output 208 may be a system of one or more speakers (e.g., 128) and the video output 212 may be, for example, one or more display screens located at one or more locations in the vehicle.

Typically, a user may control some or all of the infotainment system 146 through a user input device 204. Based on inputs received from the user input device 204, the control system 202 may determine the device that has access to one or both of the outputs 208 and 212 and a volume level for at least the audio output 208.

Remote Operator Support, Assistance, and/or Interaction

Figure 3:
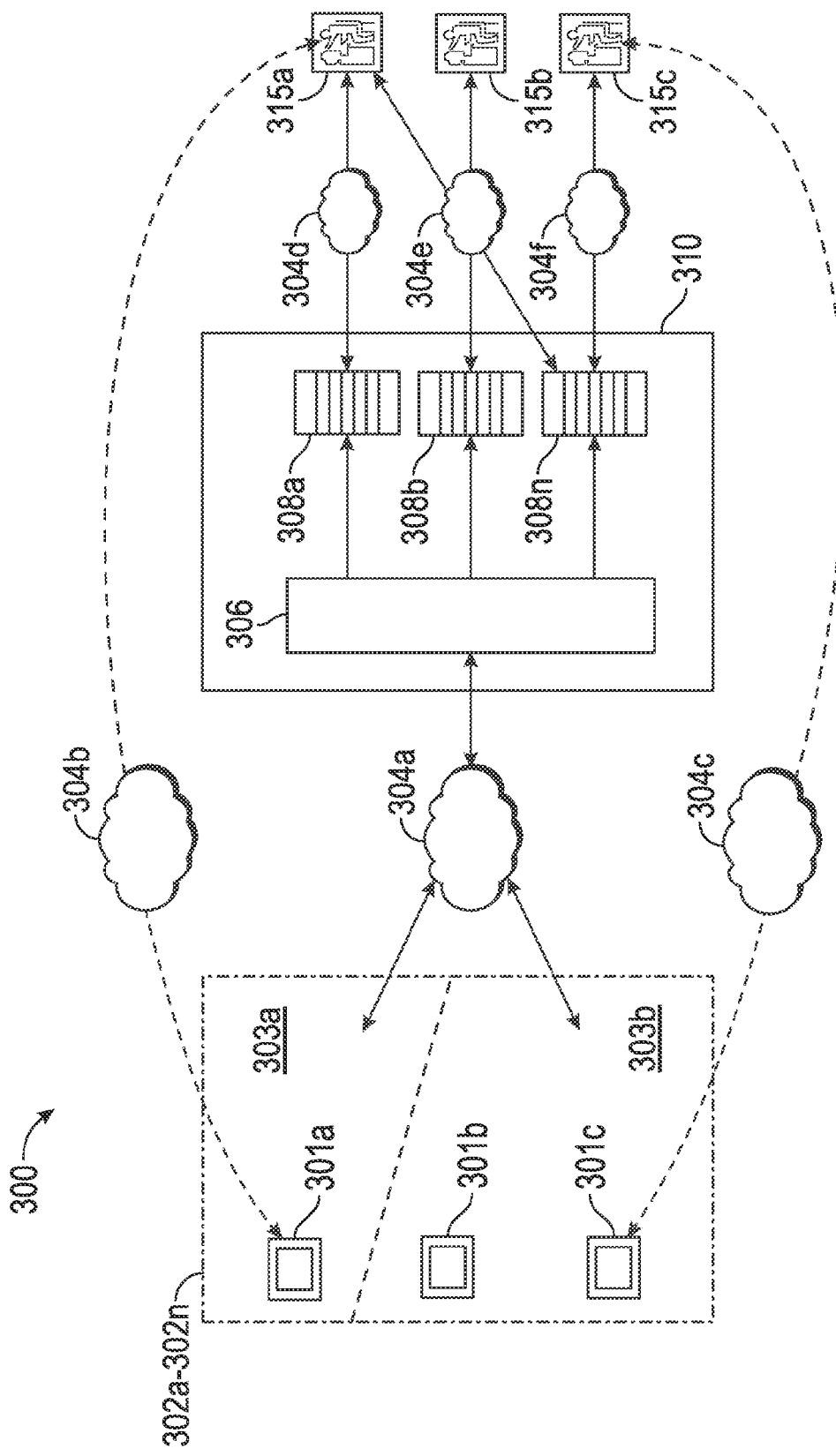
FIG. 3 is a schematic view illustrating an embodiment of a remote operator support, assistance, and/or interaction system suitable for use with the methods disclosed herein.

As noted above, in accordance with embodiments of the present disclosure, a service advisor has the ability to remotely view the infotainment displays and to observe issues the operator is having. Additionally the advisor can take control of the display, using the same controls and buttons 130 available to the operator, to help guide the operator through menus and features. Greater detail regarding such a remote operator support, assistance, and/or interaction system is now provided. Referring to FIG. 3, a block diagram of an environment 300 to provide remote interaction with a vehicle, such as vehicle 112, via a centralized service, such as call center 118, is shown and described. In more general terms, and described in connection with FIG. 3, the system includes one or more vehicles 303a, 303b (303 in general) all subscribing to an operator support, assistance, and/or interaction service 302 connected via a network 304 to a centralized service 310. In one embodiment, the centralized service 310 provides a data interface to the vehicles 303 via a network switch 306 that provides connectivity, work flow and queue management, and service process management for a remote advisor from a pool of remote advisors 315a-315c (315 in general) to provide advisory services to a device 301 within vehicles 303, such as an infotainment system 146 as described above. In an embodiment, the centralized service 310 includes one or more queues 308a-308n (308 in general) where the request from the vehicles 103 are stored. A remote advisor 315a picks up a request from a queue 108a by connecting to the centralized service 310 over a network 304d. In one embodiment, the remote advisor 315a connects to the vehicle a over a network 304b to provide remote technical service to the device 301a.

The above-depicted system is an example embodiment of an environment for deploying the on-demand service referred to as "support from spigot." The centralized service 310 include remote operator support, assistance, and/or interaction services to allow one or more remote advisors 315a-315c to perform any type and form of support, assistance, and/or interaction, service and repair on a device 301 connected via a network 304a, such as the Internet at the consumer outlet 303. The consumer outlet 303 may have a workbench providing connectivity and access to the Internet Switch and the centralized service 310 via an Internet Interface.

As previously noted, the vehicle 112, namely the system 146 thereof, may include or be operably connected to a network interface to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface may include a built-in network adapter, network interface card, PCMCIA network card, card bus network adapter, wireless network adapter, USB network adapter, modem or any other device suitable for interfacing the vehicle to any type of network capable of communication and performing the operations described herein.

The vehicle 112, and more particularly the system 146 thereof, may include any type and form of operating system, which control scheduling of tasks and access to system resources. In some embodiments, the vehicle 112 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP and WINDOWS VISTA, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In one embodiment, the centralized service 310 is executed from a server or any other computing device. The server may be referred to as a file server, application server, web server, proxy server, or gateway server. In some embodiments, the server may have the capacity to function as either an application server or as a master application server. In one embodiment, the system 300 may include multiple, logically-grouped servers. In these embodiments, the logical group of servers may be referred to as a server farm. In some of these embodiments, the servers of the farm may be geographically dispersed. In some cases, a farm may be administered as a single entity. In other embodiments, the server farm includes a plurality of server farms. In one embodiment, the server and/or server farm executes one or more applications on behalf of the centralized service 310. The servers within each farm can be heterogeneous. One or more of the servers can operate according to one type of operating system platform (e.g., WINDOWS NT, manufactured by Microsoft Corp. of Redmond, Wash.), while one or more of the other servers can operate on according to another type of operating system platform (e.g., UNIX or Linux). The group of servers logically grouped as a farm may be interconnected using a wide-area network (WAN) connection or metropolitan area network (MAN) connection.

In further overview of FIG. 3, the vehicle operator may connect the vehicle to access the centralized service 310, for example by actuating a connection or call button 130 within the vehicle as described above with regard to FIG. 1. In one embodiment, the call information transmitted upon actuation by the operator may identify the vehicle 112. In an embodiment, the switch 106 receives the information and places the vehicle 112 in a queue 108. The queue 108 may be organized and arranged in any manner including by type or category of vehicle, type or category of service, nature of the problem, etc. In an embodiment, the switch 106 includes scheduling and dispatching logic/software to dispatch the operator support, assistance, and/or interaction request to the next available remote advisor 315.

In one embodiment, the switch 306 may select the next remote advisor using any type and form of decision criteria and/or load balancing scheme. In some embodiments, the switch 306 selects the next remote advisor who is suited to perform the type of service or support, assistance, and/or interaction requested with regard to the vehicle 112. In one embodiment, the switch 306 determines from the request from the vehicle 112, a type of work and one or more service level attributes required to perform the type of work at a predetermined service threshold.

In one embodiment, the selected remote advisor 315 receives a prompt, a communication or any type and form of notice to provide interaction with the vehicle 112. The information from the switch may identify the vehicle 112. The remote advisor 315a connects to the identified vehicle 112 using any desktop sharing and remote connectivity and support, assistance, and/or interaction technology, such as via the GoToAssist technology manufactured by Citrix Online, LLC of Santa Barbara, Calif., part of Citrix Systems, Inc. of Ft. Lauderdale, Fla. or BOMGAR remote access software developed by BOMGAR of Ridgeland, Miss., to name a few. In still another embodiment, the remote advisor 315 performs any type remote operator support, assistance, and/or interaction as may be requested. For example, using the disclosed systems and methods, a service advisor 315 has the ability to remotely view the infotainment displays and to observe issues the operator is having. Additionally the advisor 315 can take control of the display of infotainment system 146, using the same controls and buttons available to the operator, to help guide the operator through menus and features thereof. The advisor 315 could also send tutorial videos and/or audio. Additionally, the advisor has the ability to initiate voice recognition and send audio directly to the voice recognition system, to provide examples to the operator on how to use the voice recognition system. The described embodiments provide remote access and control of vehicle infotainment for uses such as operator support, assistance, and/or interaction, debugging and diagnostics, and operator understanding of product usage with the operator's permission. The disclosed systems and method thus provide a shared experience with video and audio interaction between operator and advisor.

Although FIG. 3 shows a plurality of networks including network 104a between the vehicle 112 and the centralized service 310 and networks 304d-304f between the centralized service 310 and the remote advisors 315, any or all of the vehicles 112, the centralized service 310 and remote advisors 315 may be on the same network 304. In one embodiment, any of the networks 304 may be the same type of network or different types of networks. The network 304 can be a local-area network (LAN), such as a company Intranet, a metropolitan area network (MAN), or a wide area network (WAN), such as the Internet or the World Wide Web. The network(s) 304 may be a private or public network. In one embodiment, the network 304 may include all or part of land network 116.

In one embodiment, the network 304 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. In another embodiment, the topology of the network may be a bus, star, or ring network topology. In other embodiments, the network and network topology may be of any such network or network topology as known to those ordinarily skilled in the art capable of supporting the operations described herein.

In some embodiments, the centralized service 310 may connect to the vehicle 112 using any type and form of protocol, such as any internet protocols for communications. Examples of such protocols include but are not limited to application layer protocols such as HyperText Transfer Protocol (HTTP) and Dynamic Host Configuration Protocol (DHCP), transport layer protocols such as Transmission Control Protocol (TCP) and User Datagram Protocol (UDP), network layer protocols such as Internet Protocol (IP), datalink layer protocols such as IEEE 802.11, Token Ring and Ethernet and physical layer protocols such as RS-232 and Synchronous Optical Networking (SONET). In some embodiments, secure communications between the remote advisor 315 and the centralized service 310 are established via encryption, for example via a secure socket layer (SSL) or a virtual private network (VPN). In other embodiments, secure communications between the remote advisor 315 and the vehicle 112 are established via encryption, for example via a secure socket layer (SSL) or a virtual private network (VPN). In yet another embodiment, end to end security is established via the remote advisor 315 and the vehicle 112. With secured communications, the privacy of the data on a vehicle 112 may be protected and/or maintained. Because of the ubiquity of networks, network connectivity and the internet the systems and methods of the system described herein is available in just about any possible operator scenario as apparent to one ordinarily skilled in the art.

Automated Speech Recognition (ASR) System

As previously noted, the advisor has the ability to initiate voice recognition and send audio directly to the voice recognition system, to provide examples to the operator on how to use the voice recognition system. In general, a vehicle operator or service advisor vocally interacts with an automatic speech recognition system (ASR) for one or more of the following fundamental purposes: training the system to understand a vehicle operator's particular voice; storing discrete speech such as a spoken nametag or a spoken control word like a numeral or keyword; or recognizing the vehicle operator's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

Figure 4:
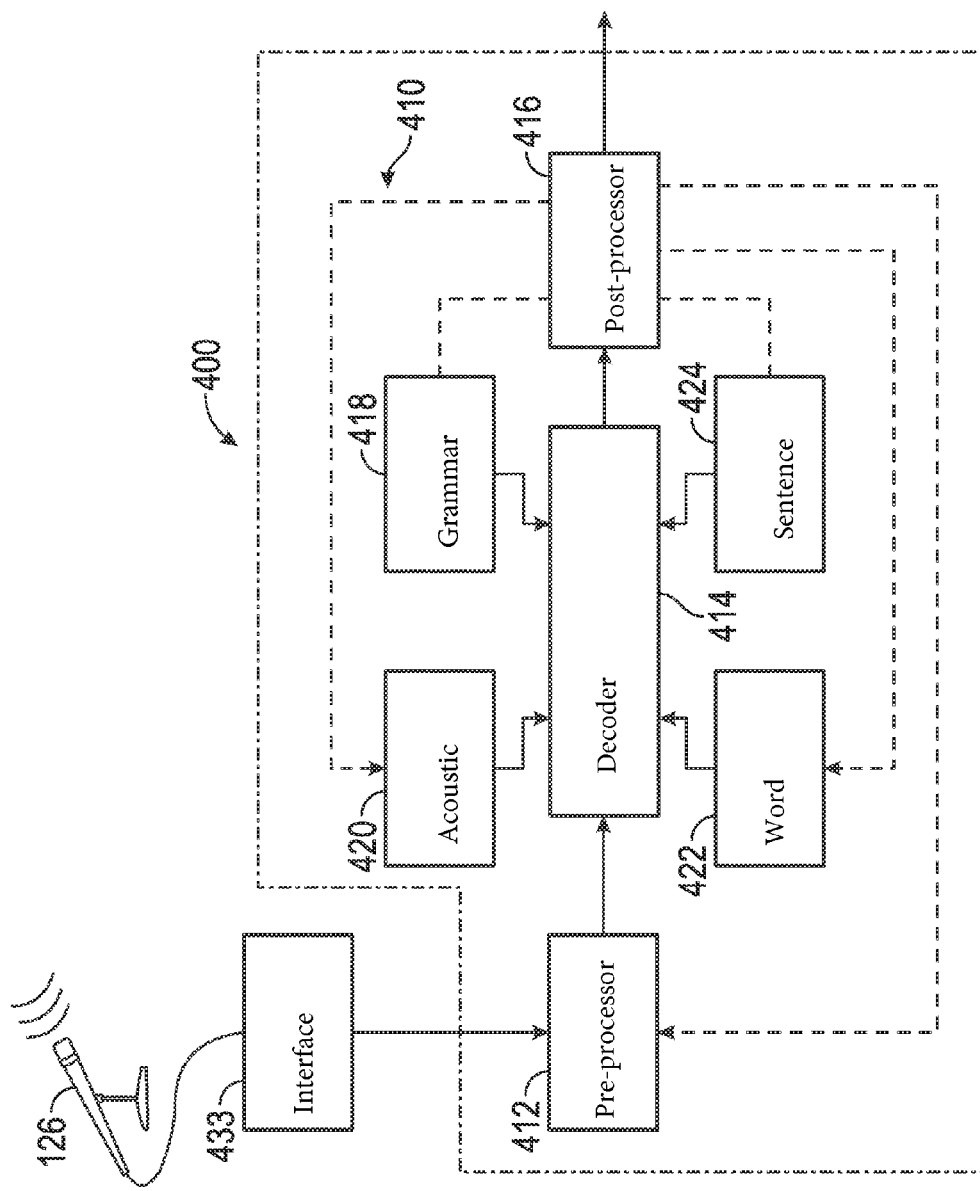
FIG. 4 is a schematic view illustrating an embodiment of an automated speech recognition (ASR) system suitable for use with the methods disclosed herein.

ASR systems are generally known to those skilled in the art, and FIG. 4 illustrates a specific exemplary architecture for an ASR system 410 that can be used to enable the presently disclosed method. The system 410 includes a device to receive speech such as the telematics microphone 126, and an acoustic interface 433 such as a sound card of the telematics unit 124 to digitize the speech into acoustic data. The system 410 also includes a memory such as the telematics memory 140 for storing the acoustic data and storing speech recognition software and databases, and a processor such as a telematics processor to process the acoustic data. The processor functions with the memory and in conjunction with the following modules: a front-end processor or pre-processor software module 412 for parsing streams of the acoustic data of the speech into parametric representations such as acoustic features; a decoder software module 414 for decoding the acoustic features to yield digital subword or word output data corresponding to the input speech utterances; and a post-processor software module 416 for using the output data from the decoder module 414 for any suitable purpose.

One or more modules or models can be used as input to the decoder module 414. First, grammar and/or lexicon model(s) 418 can provide rules governing which words can logically follow other words to form valid sentences. In a broad sense, a grammar can define a universe of vocabulary the system 410 expects at any given time in any given ASR mode. For example, if the system 410 is in a training mode for training commands, then the grammar model(s) 418 can include all commands known to and used by the system 410. In another example, if the system 410 is in a main menu mode, then the active grammar model(s) 418 can include all main menu commands expected by the system 410 such as call, dial, exit, delete, directory, or the like. Second, acoustic model(s) 420 assist with selection of most likely subwords or words corresponding to input from the pre-processor module 412. Third, word model(s) 422 and sentence/language model(s) 424 provide rules, syntax, and/or semantics in placing the selected subwords or words into word or sentence context. Also, the sentence/language model(s) 424 can define a universe of sentences the system 410 expects at any given time in any given ASR mode, and/or can provide rules, etc., governing which sentences can logically follow other sentences to form valid extended speech.

According to an alternative exemplary embodiment, some or all of the ASR system 410 can be resident on, and processed using, computing equipment in a location remote from the vehicle 112 such as the call center 118. For example, grammar models, acoustic models, and the like can be stored in memory of one of the servers and/or databases in the call center 118 and communicated to the vehicle telematics unit 124 for in-vehicle speech processing. Similarly, speech recognition software can be processed using processors of one of the servers in the call center 118. In other words, the ASR system 410 can be resident in the telematics system 124 or distributed across the call center 118 and the vehicle 112 in any desired manner.

First, acoustic data is extracted from human speech wherein a vehicle operator speaks into the microphone 126, which converts the utterances into electrical signals and communicates such signals to an acoustic interface. A sound-responsive element in the microphone 126 captures the occupant's speech utterances as variations in air pressure and converts the utterances into corresponding variations of analog electrical signals such as direct current or voltage. The acoustic interface receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface converts the analog electrical signals into digital electronic signals. The digital data are binary bits which are buffered in the telematics memory 140 and then processed by the telematics processor or can be processed as they are initially received by the processor in real-time.

Second, the pre-processor module 412 transforms the continuous stream of digital speech data into discrete sequences of acoustic parameters. More specifically, the processor executes the pre-processor module 412 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 412 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module 414 to process the incoming feature vectors of each test pattern. The decoder module 414 is also known as a recognition engine or classifier, and uses stored known reference patterns of speech. Like the test patterns, the reference patterns are defined as a concatenation of related acoustic frames and corresponding parameters. The decoder module 414 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMMs for a sequence of subwords can be concatenated to establish word HMMs.

The speech recognition decoder 414 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of a word or subword and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle operator or certain acoustic conditions can be adapted and saved as another set of reference patterns for a different vehicle operator or different acoustic conditions, based on a limited amount of training data from the different vehicle operator or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 422 and to construct sentences with the input from the language models 424.

Finally, the post-processor software module 416 receives the output data from the decoder module 414 for any suitable purpose. For example, the post-processor module 416 can be used to convert acoustic data into text or digits for use with other aspects of the ASR system or other vehicle systems. In another example, the post-processor module 416 can be used to provide training feedback to the decoder 414 or pre-processor 412. More specifically, the post-processor 416 can be used to train acoustic models for the decoder module 414, or to train adaptation parameters for the pre-processor module 412.

Exemplary Operator Support, Assistance, and/or Interaction System Architecture

Figure 5:
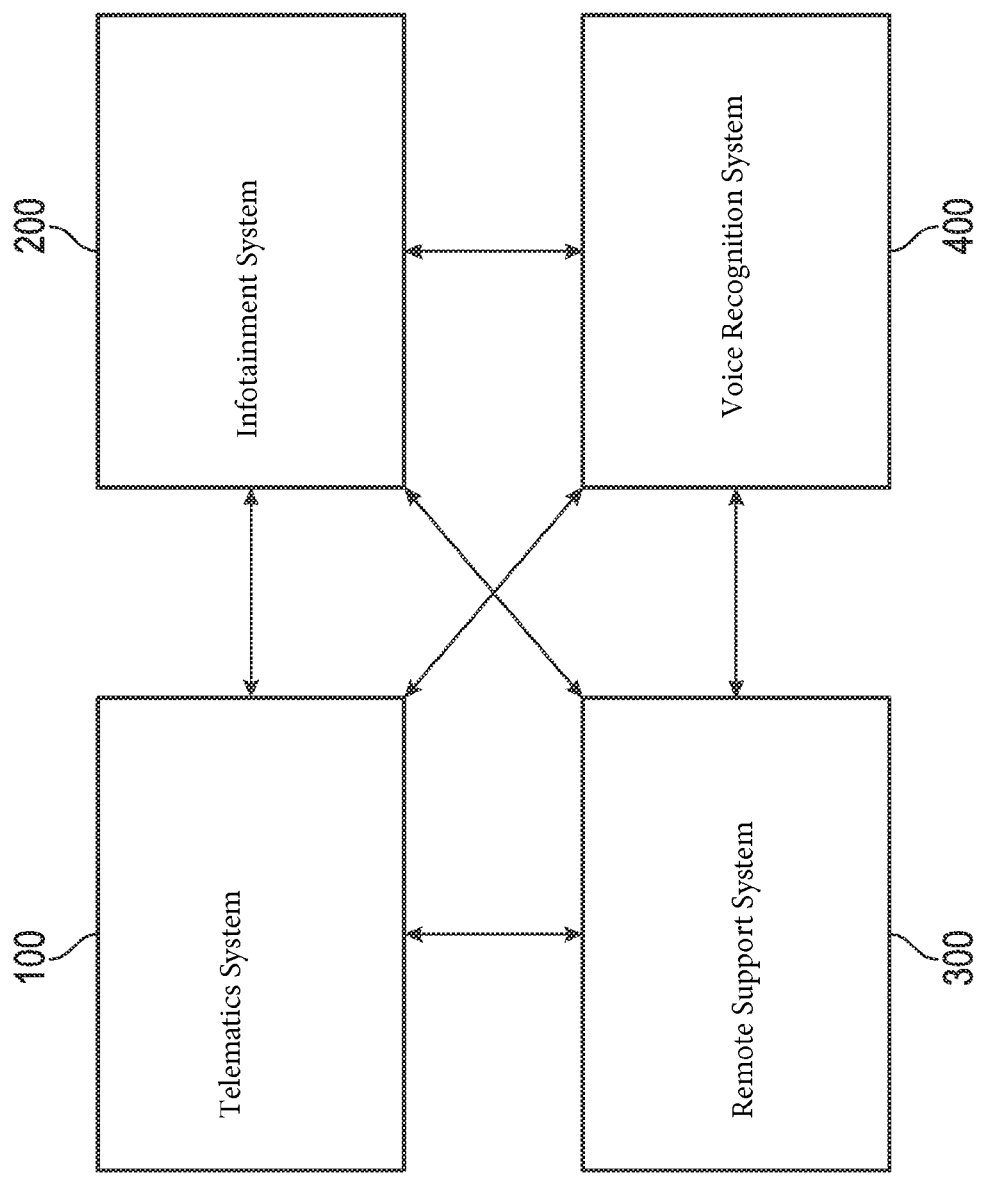
FIG. 5 is a schematic view illustrating the interaction between the telematics service system illustrated in FIG. 1, the infotainment system illustrated in FIG. 2, the remote operator support, assistance, and/or interaction system illustrated in FIG. 3, and the automated speech recognition system illustrated in FIG. 4, in accordance with various exemplary embodiments of the present disclosure.

FIG. 5 discloses an exemplary operator support, assistance, and/or interaction system architecture in accordance with various embodiments of the present disclosure. In particular, FIG. 5 is a schematic view illustrating the interaction between the telematics service system illustrated in FIG. 1, the infotainment system illustrated in FIG. 2, the remote operator support, assistance, and/or interaction system illustrated in FIG. 3, and the automated speech recognition system illustrated in FIG. 4, in accordance with various exemplary embodiments of the present disclosure. As such, FIG. 5 discloses systems for providing operator support, assistance, and/or interaction in the operation of vehicle systems, such as vehicle information and entertainment systems. FIG. 5 provides an enhanced, comprehensive means of assisting an operator with their infotainment system and reporting issues observed. FIG. 5 illustrates the use of a telematics service system 100 to verbally communicate with an operator of a vehicle and electronically communicate with a vehicle infotainment 200 system for the purposes of providing interaction with the operator in the use of the vehicle infotainment system 200 using remote operator support, assistance, and/or interaction system 300. Using the disclosed systems, a service advisor has the ability to remotely view the infotainment displays and to observe issues the operator is having in using the infotainment system 200. Using system 300, the advisor can take control of the display, using the same controls and buttons available to the operator, to help guide the operator through menus and features. The advisor could also send tutorial videos and/or audio using system 300. Additionally, the advisor has the ability to initiate voice recognition and send audio directly to the voice recognition system 400, to provide examples to the operator on how to use the voice recognition system. The described embodiments provide remote access and control of vehicle infotainment for uses such as operator support, assistance, and/or interaction, debugging and diagnostics, and operator understanding of product usage with the operator's permission. The disclosed systems and method thus provide a shared experience with video and audio interaction between operator and advisor.

Exemplary Method

Figure 6:
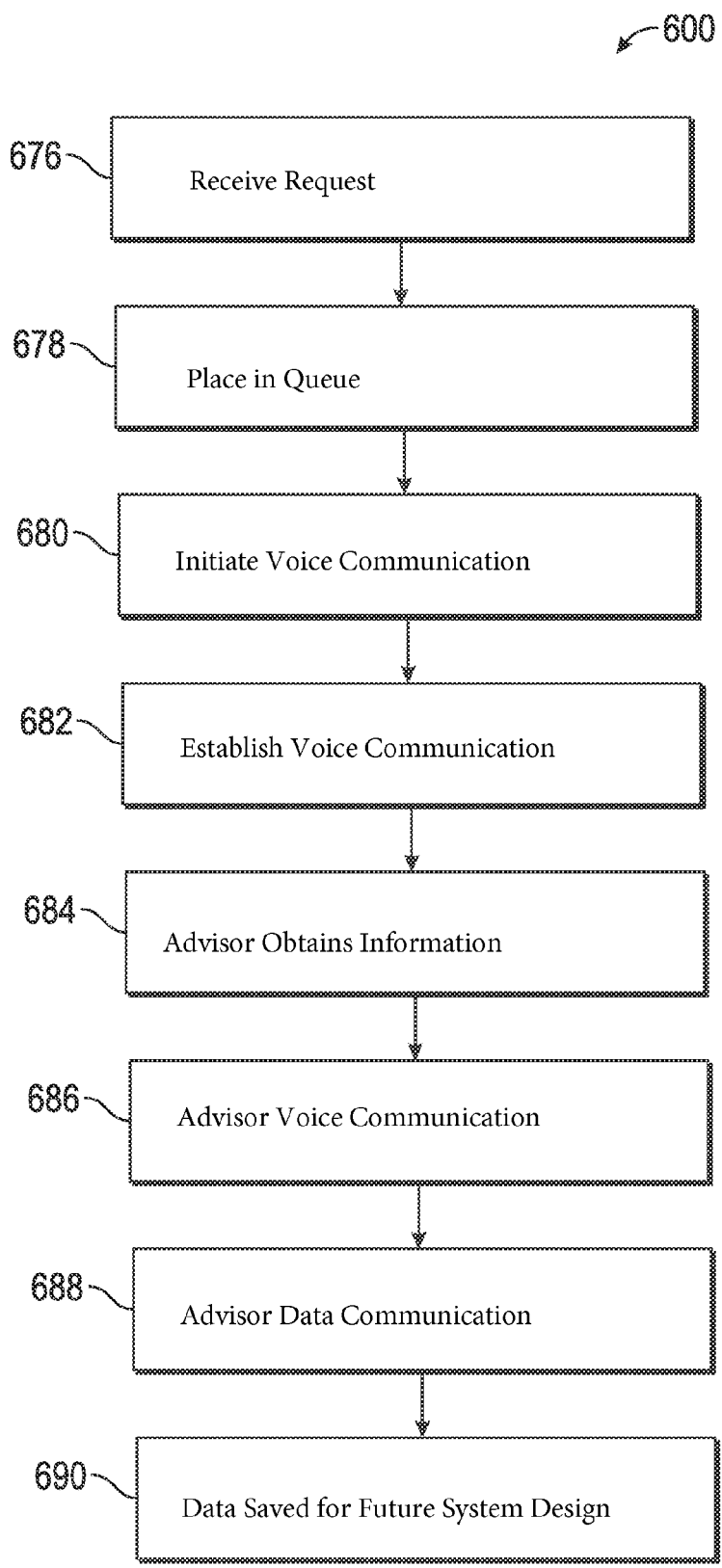
FIG. 6 is a flow diagram illustrating an embodiment of a method for providing operator support, assistance, and/or interaction utilizing a telematics service system in accordance with various embodiments of the present disclosure.

FIG. 6 is a flow diagram illustrating an embodiment of a method 600 for providing remote operator support, assistance, and/or interaction utilizing a telematics service system. In the embodiment illustrated in FIG. 6, the remote operator support, assistance, and/or interaction is carried out through voice communications with the operator and through data communications with the vehicle, as described above. In this embodiment, the operators communicate with a call center advisor, or some other person who is remotely located at the call center, at an analogous facility, or at some other location. The subject matter for such discussions may include, but are not limited to, the operator's use of the vehicle telematics system, and any problems in such use that the operator may be encountering. Such conversations may occur contemporaneously with, or immediately after, the transfer of data between the vehicle and the call center. With continuing reference to FIG. 6, method 600 may be implemented via telematics service system 100, while in other embodiments, method 600 may be implemented via any other suitable telematics service system.

At block 676, a request for support, assistance, and/or interaction is received from each operator of each vehicle of a plurality of vehicles from whom support, assistance, and/or interaction is sought. Such request may be obtained at any time that the operator is operating the vehicle, or merely the telematics service of the vehicle, or at any other time as may be deemed suitable.

At block 678, the operators request is placed into a queue, as described above with regard to system 300. In some embodiments, a time and date is selected for the service when each operator anticipates being in the vehicle. In other embodiments, the operators may contact the advisors using telematics service system 100 at a time of the operator's choosing. The service advisors may be on duty at a call center twenty four hours a day to accommodate the varying schedules of the operators. For example, advisory service may be requested and/or given any time that the operator utilizes the telematics service system by contacting a service advisor in the call center. In other examples, the telematics service system may be configured to detect when the operator's vehicle is in motion and may initiate voice communications with the operator at that time.

At block 680, voice communication is initiated with each of the operators using the telematics service system. Voice communication may be initiated by either the operator or the service advisor. In instances where the service has been scheduled, the advisor may initiate voice communication with the operator at the date and time agreed to by the operator.

At block 682, voice communication between the operators and service advisors is established. The service advisors and the operators communicate with one another wirelessly using the telematics service system. This voice communication occurs while each operator is located in the vehicle. For example, this voice communication may occur while each operator is driving the vehicle, after the operator is done driving the vehicle but prior to egress from the vehicle, prior to driving the vehicle, or during a break or intermittent discontinuation of vehicle operations.

At block 684, the service advisors obtain information from the operators. The information obtained may relate to each operator's experience operating telematics service system of the vehicle, and any difficulties in the use thereof that the operator may be encountering. For example, the operator may be asked about technical problems which the operator is currently observing or has previously observed with the telematics unit. Using the disclosed systems, a service advisor has the ability to remotely view the infotainment displays and to observe issues the operator is having in using the infotainment system 200. Using system 300, the advisor can take control of the display, using the same controls and buttons available to the operator, to help guide the operator through menus and features. Additionally, the advisor has the ability to initiate voice recognition and send audio directly to the voice recognition system 400, to provide examples to the operator on how to use the voice recognition system. Other inquiries may also be made.

At block 686, service advisors may also engage in voice communication with one or more passengers located in the operator's vehicle, if desired. Each passenger may thus receive service in using the telematics unit while riding in the vehicle. The service provided to the passenger may be similar or identical to the service provided to the operator.

In some embodiments, at block 688, visual information such as pictures or video images may be downloaded to the operator's vehicle using the telematics services. The advisor could also send tutorial videos and/or audio using system 300. The visual information may be demonstrated to the operator on any display screen in the vehicle that is connected (either wirelessly or via a wired connection) to the vehicle bus or connected (either wirelessly or via a wired connection) to a component that is connected to the vehicle bus. Examples of suitable display screens include, but are not limited to, the vehicle's DVD entertainment system, the vehicle's in-dash navigation system, the vehicle's backup camera display screen, an aftermarket navigation system having a wireless connection to the vehicle, a cell phone, or any other wireless portable device that is capable of wirelessly connecting to the vehicle.

At block 690, the information provided by each of the operators may be utilized by the service advisors to determine an appropriate design for future vehicles. For example, the information provided by the operators may be utilized by service advisors to determine the design and configuration of the telematics system based on the communications with the operators. The service advisors may also use the information provided by the operators to make recommendations concerning product content such as which features should and should not be offered and which options should and should not be available in a particular vehicle model. Such recommendations may be utilized by product designers to add or delete content from product offerings, and to include or exclude options in certain vehicle lines. Information provided by each of the operators may also be used by service advisors, product designers, manufacturers, or any other entity in any other way.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather than, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A method for providing interaction with an operator of a vehicle, comprising:
    receiving a request, from the operator of the vehicle and using a telematics system of the vehicle, for support or assistance regarding use of the telematics system, wherein the telematics system is provided as a hardware component of the vehicle that is connected via a vehicle bus to a microphone within the vehicle, to a speaker within the vehicle, to a display unit within the vehicle, and to a cellular network antenna within the vehicle;
    establishing a remote voice communication link between the vehicle and a remotely located call center, using the speaker and the cellular network antenna of the telematics system;
    establishing a remote data communication link between the vehicle and the remotely located call center, using the cellular network antenna of the telematics system;
    providing verbal interaction or instruction regarding the use of the telematics system through the established remote voice communication, using the speaker of the telematics system; and
    providing audio and visual remote control from a remotely-located service advisor, demonstrating or executing the use of the telematics system through the established remote data communication link, using the display unit of the telematics system, and further providing a tutorial video regarding the use of one or more features of the telematics system that is playable on the display unit at the election of either the operator or the advisor using the telematics system, wherein providing the audio and visual remote control and providing the tutorial video are performed simultaneously while the voice communication link and the data communication link remain established.

2. The method of claim 1, wherein receiving a request comprises receiving an electronic signal transmission.

3. The method of claim 2, wherein receiving a request comprises receiving a wireless signal transmission.

4. The method of claim 1, wherein establishing a remote voice communication link comprises establishing using a wireless network.

5. The method of claim 4, wherein establishing a remote voice communication link and receiving a request are performed through the same wireless network.

6. The method of claim 1, wherein providing verbal interaction or instruction comprises a voice communication from the operator.

7. The method of claim 6, wherein providing verbal interaction or instruction comprises a further voice communication in response to the voice communication from the operator.

8. The method of claim 1, wherein providing audio/visual remote control comprises sending an electronic signal transmission.

9. The method of claim 8, wherein providing audio/visual remote control comprises sending a wireless signal transmission comprising both an audio component and a video component.

10. The method of claim 1, wherein demonstrating or executing the use of the telematics system comprises remotely controlling the telematics system from the remotely located call center.

11. A method for providing interaction with an operator of a vehicle, comprising:
- initiating a request, from the operator of the vehicle and using a telematics system of the vehicle, for support or assistance regarding use of the telematics system, wherein the telematics system is provided as a hardware component of the vehicle that is connected via a vehicle bus to a microphone within the vehicle, to a speaker within the vehicle, to a display unit within the vehicle, and to a cellular network antenna within the vehicle;
- establishing a remote voice communication link between the vehicle and a remotely located call center, using the speaker and the cellular network antenna of the telematics system;
- establishing a remote data communication link between the vehicle and the remotely located call center, using the cellular network antenna of the telematics system;
- receiving verbal interaction or instruction regarding the use of the telematics system through the established remote voice communication, using the speaker of the telematics system; and
- receiving audio and visual remote control from a remotely-located service advisor, demonstrating or executing the use of the telematics system through the established remote data communication link, using the display unit of the telematics system, and further receiving a tutorial video regarding the use of one or more features of the telematics system that is playable on the display unit at the election of either the operator or the advisor using the telematics system, wherein receiving the audio and visual remote control and receiving the tutorial video are performed simultaneously while the voice communication link and the data communication link remain established.

12. The method of claim 11, wherein initiating a request comprises initiating an electronic signal transmission.

13. The method of claim 12, wherein initiating a request comprises initiating a wireless signal transmission.

14. The method of claim 11, wherein establishing a remote voice communication link comprises establishing using a wireless network.

15. The method of claim 14, wherein establishing a remote voice communication link and initiating a request are performed through the same wireless network.

16. The method of claim 11, wherein receiving verbal interaction or instruction comprises a voice communication from a remotely-located service advisor.

17. The method of claim 16, wherein providing verbal interaction or instruction comprises a further voice communication in response to the voice communication from the service advisor.

18. The method of claim 11, wherein receiving audio/visual remote control comprises receiving an electronic signal transmission.

19. The method of claim 18, wherein receiving audio/visual remote control comprises receiving a wireless signal transmission comprising both an audio component and a video component.

20. A method for providing interaction with an operator of a vehicle, comprising:
- receiving a request, from the operator of the vehicle and using a telematics system of the vehicle, for support or assistance regarding use of the telematics system, wherein the telematics system is provided as a hardware component of the vehicle that is connected via a vehicle bus to a microphone within the vehicle, to a speaker within the vehicle, to a display unit within the vehicle, and to a cellular network antenna within the vehicle;
- establishing a remote voice communication link between the vehicle and a remotely located call center, using the speaker and the cellular network antenna of the telematics system;
- establishing a remote data communication link between the vehicle and the remotely located call center, using the cellular network antenna of the telematics system;
- providing verbal interaction or instruction regarding the use of the telematics system through the established remote voice communication, using the speaker of the telematics system;
- providing audio and visual remote control from a remotely-located service advisor, demonstrating or executing the use of the telematics system through the established remote data communication link, using the display unit of the telematics system, and further providing a tutorial video regarding the use of one or more features of the telematics system that is playable on the display unit at the election of either the operator or the advisor using the telematics system, wherein providing the audio and visual remote control and providing the tutorial video are performed simultaneously while the voice communication link and the data communication link remain established; and
- further providing audio commands, using the cellular network antenna and the speaker of the telematics system, wherein the audio commands are received into a voice recognition system of the vehicle to cause a function to be performed in the vehicle, and wherein the audio commands are configured to demonstrate the function using the voice recognition system.

* * * * *